Feb. 11, 1964   H. W. KASEMIR   3,121,196
INSTRUMENT FOR MEASURING ELECTRICAL AIR-EARTH CURRENT
Filed Feb. 6, 1961

INVENTOR,
HEINZ W. KASEMIR
BY Harry M. Saragovitz
ATTORNEY

United States Patent Office 3,121,196
Patented Feb. 11, 1964

3,121,196
INSTRUMENT FOR MEASURING ELECTRICAL AIR-EARTH CURRENT
Heinz W. Kasemir, Neptune, N.J., assignor to the United States of America as represented by the Secretary of the Army
Filed Feb. 6, 1961, Ser. No. 87,504
8 Claims. (Cl. 324—32)
(Granted under Title 35, U.S. Code (1952), sec. 266)

The invention described herein may be manufactured and used by or for the Government for governmental purposes without the payment of any royalty thereon.

The present invention relates to the measurement of the atmospheric air-earth current density and more particularly to a novel device by which said measurement may be effected at various altitudes by means of air-borne equipment.

It has been known for several hundred years that the earth carries a negative electrical charge and the atmosphere a positive charge. Since the atmosphere is not a perfect insulator, a conduction current flows in the atmosphere, carrying positive charge downward to the earth. This air-earth "battery" is re-charged during thunderstorms by lightning and point discharge, which reverse the direction of current flow, carrying negative charge to earth and positive charge to the upper atmosphere. Ionization of the upper atmosphere by cosmic rays and other fast-moving particles produces positively and negatively charged particles which support the flow of air-earth current. World-wide air-earth current has been estimated at 1800 amperes. The corresponding current density is of the order of micro-micro amperes per square meter.

Prior to the instant invention measurements of air-earth current were made at ground level by such methods as collecting the atmospheric charge on large metal plates mounted flush with the earth but insulated therefrom. Also, the current at various altitudes has been measured indirectly by measuring the positive and negative atmospheric conductivity and also the potential gradient by means of separate air-borne instruments. The total conductivity is then obtained as the sum of the positive and negative conductivities. The current density is then calculated as the product of conductivity and potential gradient. The present invention provides a device by which the air-earth current may be directly measured at various altitudes by means of a single, simple instrument which may be carried aloft by a radiosonde type balloon or any other type of aircraft.

Briefly stated, the invention comprises a pair of conductive current collectors which may be in the form of wires suspended along a vertical line beneath a balloon. The inner ends of the current collectors are connected by means of a resistor shunted by a capacitor. This resistor is made small compared to the resistance of the surrounding air path and therefore the atmospheric currents are diverted from the surrounding air to the instrument. The shunt capacitor serves to separate the displacement current from the conduction current. The voltage drop across the resistor frequency modulates a radiosonde transmitter which telemeters the information back to a ground station. A mathematical analysis is shown by which the instrument may be calibrated.

It is therefore an object of this invention to provide an improved apparatus for measuring air-earth currents.

This and other objects and advantages of the present invention will become apparent from the following detailed description and drawings, in which.

Figure 1:
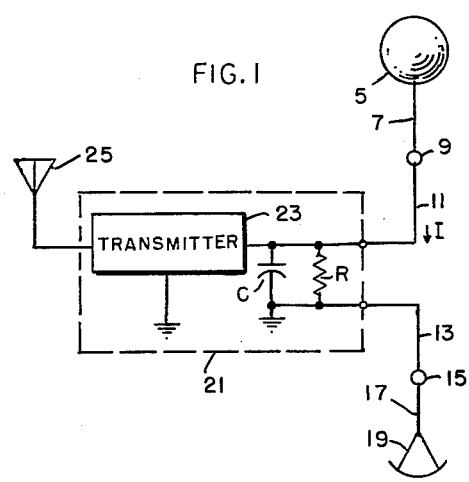
FIG. 1 is a schematic diagram of one embodiment of the novel apparatus.

In FIG. 1 is shown the arrangement of the balloon 5, the current collectors 11 and 13 and the radiosonde 21. The current collectors comprise two vertical conductive wires, the upper one being suspended from the balloon by means of an insulated nylon cord 7, which is made long enough to isolate the instrument from the influence of any static charge acquired by the balloon. The lower current collector 13 is made equal in length to 11 and is suspended beneath radiosonde 21. Collector 13 is held vertical and taut by means of inverted parachute 19 and insulated nylon cord 17. The inner ends of the current collector are electrically connected by means of the parallel combination of R and C. In a normal fair weather field, positive charge is collected by the upper current collector and negative charge by the lower collector. These charges flow through R and C, producing a voltage drop proportional to the current collected. This voltage frequency-modulates the output of transmitter 23, which is then transmitted back to earth via antenna 25. The configuration of the current collectors may take other forms, but should be equal in size in order that equal amounts of positive and negative charge be collected, and should be symmetrically disposed with respect to resistor R. The wire type collectors illustrated have been found to be best suited for balloon-borne radiosonde type instruments. The elements 9 and 15, mounted at the outer ends of the current collectors, may be conductive rings or conductive balls. These elements serve to connect the two insulated cords to the ends of the current collectors and also serve to prevent point discharge from the ends of the current collectors. The strong electric fields existing in the vicinity of thunderheads would otherwise cause point discharge from the sharp ends of the current collectors, producing spurious readings.

The resistor R is made small compared to the resistance of the surrounding air. The atmospheric current therefore takes the path of least resistance and is diverted through the instrument, where it can be measured. The numerical value of R, in ohms, should be less than one percent of the resistance of that part of the surrounding atmosphere from which current is diverted. This part of the surrounding atmosphere is called the effective volume of the collector system and may be computed by means of the mathematical analysis given below.

The system described collects the complete atmospheric current, which is composed of the conduction current and a displacement current. Since the earth-air current is defined as the conduction current, some means must be provided for separating these two components of current. The capacitor C serves this function. The displacement current results from fluctuation of the atmospheric electric field, which causes an induced shift in the static charge distribution on the collector system. If the time constant of R and C is chosen to match the time constant of the surrounding air, all of the displacement current will be neutralized or by-passed by C, and the current through R will equal the conduction current. The time constant, $\theta$, of the atmosphere is measured in seconds and is equal to the dielectric constant of the air ($\epsilon$), expressed in farads per meter, divided by the air conductivity ($\lambda$), expressed in (ohm-meters)$^{-1}$. As a practical matter it is impossible to obtain an exact match under all conditions, since the air conductivity varies with weather conditions and altitude, generally increasing with altitude. In practice, the time constant (RC) of the instrument is set on a fixed value matching the air time constant ($\theta$) for an average conductivity value in the region of interest.

In order to convert the current readings obtained from this instrument into corresponding air-earth current densities, it is necessary to calculate a calibration factor, herein called the effective area of the collector system (M). The air-earth current forms a homogeneous field of current flow of current density $i$ (amperes per meter$^2$). From this the collector system will receive a certain amount of current, I (amperes). I is proportional to the air-earth current density, $i$. M, the effective area, is the proportionality factor between $i$ and I, $$i = \frac{I}{M}$$

and its value depends on the configuration of the collector only. M is calculated by representing the upper and lower collectors as the upper and lower halves of a prolate spheroid. The problem may then be formulated as follows: Given is a homogeneous field of current flow of current density $i$. Inserted therein is a prolate conducting spheroid with the long axis $a$ parallel to the lines of current flow, $a$ being equal to the length of the upper or lower current collector. Both small axes are equal and called $b$. The eccentricity of the spheroid is $c$. The current flows into the upper half, and the lower half of the spheroid will be calculated.

The calculation is best worked out in elliptical coordinates $u$, $v$, and $\alpha$, but, because of their unfamiliarity the end results are converted to cylindrical coordinates $z$, $r$ and $\alpha$. The relationship between these two coordinate systems is given by the equations:

$$\frac{z^2}{u^2} + \frac{r^2}{u^2 - c^2} = 1$$
$$\alpha = \alpha$$
$$\frac{z^2}{v^2} - \frac{r^2}{c^2 - v^2} = 1 \quad (1)$$

The spheroid is given by setting $u = a$

The potential function $\phi$ of a prolate spheroid inserted in a homogeneous field F is given by the equation:

$$\phi = FuP_1\left(1 - \frac{a}{u}\frac{Q_1}{Q_{1a}}\right) \quad (2)$$

wherein:

F = atmospheric field (volts per meter);

$$P_1 = \frac{v}{c}$$

= spherical function of the first kind and first order $$Q_1 = \frac{u}{2c}\ln\left(\frac{u+c}{u-c}\right) - 1$$

= spherical function of the second kind and first order, the subscript $a$ of the function $Q_1$ indicates that $u = a$ Differentiation of (2) with respect to $u$ and then setting $u = a$ gives the field strength E (volts per meter) at the surface of the spheroid:

$$E = \frac{-FP_1}{U_a Q_{1a}}\left(Q_{1a} - \frac{a}{c}Q_{1a}\right) = -\frac{FP_1}{U_a Q_{1a}}\left(\frac{c^2}{a^2 - c^2}\right) \quad (3)$$

wherein $$U = \left(\frac{u^2 - v^2}{u^2 - c^2}\right)^{1/2}$$

and the subscript $a$ indicates that $u = a$

According to Ohm's law, the following relationship holds:

$$\lambda E = j \text{ and } \lambda F = i \quad (4)$$

wherein F is the atmospheric electric field (volts per meter) and $j$ is the current density at the surface of the spheroid in amperes per meter$^2$.

If $j$ and $i$ are substituted for E and F in (3), the current density $j$ at the surface of the spheroid is obtained:

$$j = -i\frac{P_1}{U_a Q_{1a}}\left(\frac{c^2}{a^2 - c^2}\right) \quad (5)$$

The integration with respect to the angle $\alpha$ from 0 to $2\pi$ and along the long axis from $v_1$ to $v_2$ gives the current $j_{12}$ flowing into a ring zone of the spheroid. The integral:

$$j_{12} = \int_{v_1}^{v_2} j\, dS$$

can be solved, and $$j_{12} = -i\frac{\pi}{Q_{1a}}(v_2 + v_1)(v_2 - v_1) \quad (6)$$

is obtained.

Now, substituting the cylindrical for the elliptical coordinates. From Equation 1, with $u = a$:

$$z = \frac{av}{c} \text{ or } v = \frac{c}{a}z \quad (7)$$

is obtained

By inserting (7) and (6)

$$j_{12} = -i\frac{\pi}{Q_{1a}}\frac{c^2}{a^2}(z_2 + z_1)(z_2 - z_1) \quad (8)$$

To obtain the current $I_u$ flowing into the upper half of the spheroid, set $z_2 = a$ and $z_1 = 0$.

$$I_u = -\frac{\pi c^2}{Q_{1a}}i \quad (9)$$

The current $I_o$ flowing into the lower half is given by Equation 8 for $z_2 = 0$ and $z_1 = -a$ $$I_o = \frac{\pi c^2}{Q_{1a}}i \quad (10)$$

These currents $I_u$ and $I_o$ are of equal amount but opposite polarity in the steady-state condition. They will cancel each other inside the spheroid.

The factor $$M = \frac{\pi c^2}{Q_{1a}} \quad (11)$$

in Equations 8 and 10 is the effective area of the collector system to be calculated. As the wire type collector is long compared to its radius, the eccentricity $c$ can be replaced by the axis $a$ without appreciable error. With $$Q_{1a} = \frac{a}{2c}\left(\ln\frac{a+c}{a-c}\right) - 1 = \frac{a}{c}\left(\ln\frac{a+c}{b}\right) - 1 = \left(\ln\frac{2a}{b}\right) - 1$$

the simple formula for the effective area is obtained:

$$M = \frac{\pi a^2}{\left(\ln\frac{2a}{b}\right) - 1} \quad (12)$$

The denominator of (12) changes little for a wide variation of the length and thickness of the collector wire. The factor $$\frac{\pi}{\left(\ln\frac{2a}{b}\right) - 1}$$

has the approximate value of 1/3 therefore, the approximate formula:

$$M = \frac{a^2}{3} \quad (13)$$

may be used.

Figure 2:
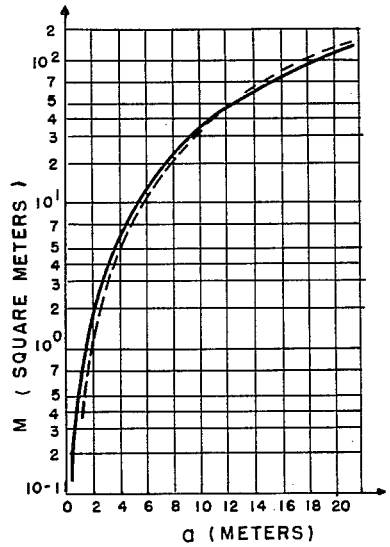
FIG. 2 is a curve showing the effective area of the collector system as a function of collector length.

In the range of M from 10–150 square meters or $a$ from 1.6–20 meters, the error in (13) changes from −3 percent to +5 percent, being zero for M=50 square meters. FIG. 2 shows the effective area M as a function of the length $a$ of each collector. The collector wire diameter, $2b$, is assumed to be 1.5 mm. The solid line curve is calculated from the exact Formula 12, while the dashed line curve shows the approximation according to Formula 13. In practice, the length of the collectors is chosen so that a current in the proper range is delivered to the radiosonde, and an even calibration factor results. For instance, a collector length of 5.21, 7.55, 12.22 or 17.60 meters corresponds to an effective area of 10, 20, 50 or 100 square meters, respectively. For an average air-earth current density of $1 \times 10^{-12}$ amperes per square meter, these collectors will deliver currents of $1.0 \times 10^{-11}$, $2.0 \times 10^{-11}$, $5.0 \times 10^{-11}$ or $1.0 \times 10^{-10}$ amperes of the radiosonde input circuit. For the instrument described here, a collector length of 7.55 meters has been used for test flights in Greenland where the average air-earth current density is about $3.0 \times 10^{-12}$ amperes per square meter. A collector length of 12.22 meters was found best for test flights in New Jersey, where the current density is lower. These figures are merely illustrative and should not be interpreted as limiting the practice of the invention to any particular collector lengths.

Alternatively, the value of M for any particular collector configuration can be calculated by comparing the actual current collected by the instant instrument to the air-earth current as measured in the same region by an independent instrument, such as one of the prior art devices mentioned above.

Figure 3:
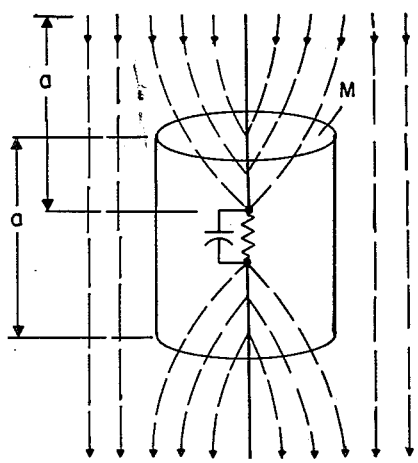
FIG. 3 is a schematic diagram illustrating the operation of the novel apparatus.

FIG. 3 is a diagram useful in visualizing the meaning of the mathematical operations performed above. FIG. 3 shows a collector system similar to that of FIG. 1. Centered on the midpoint of the collector system is an imaginary cylinder of height $a$ (equal to the length of each collector) and cross-sectional area M. The volume of this cylinder is the effective volume of the collector system, referred to above, and represents that portion of the surrounding air from which current is diverted. The dashed lines are lines of current flow. The value of R should be made less than one percent of the resistance between the ends of this cylinder.

Figure 5:
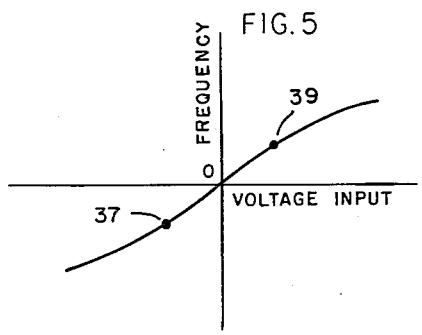
FIG. 5 is a curve of the transmission characteristic of a radiosonde transmitter which may be used to telemeter the information to earth.
Figure 4:
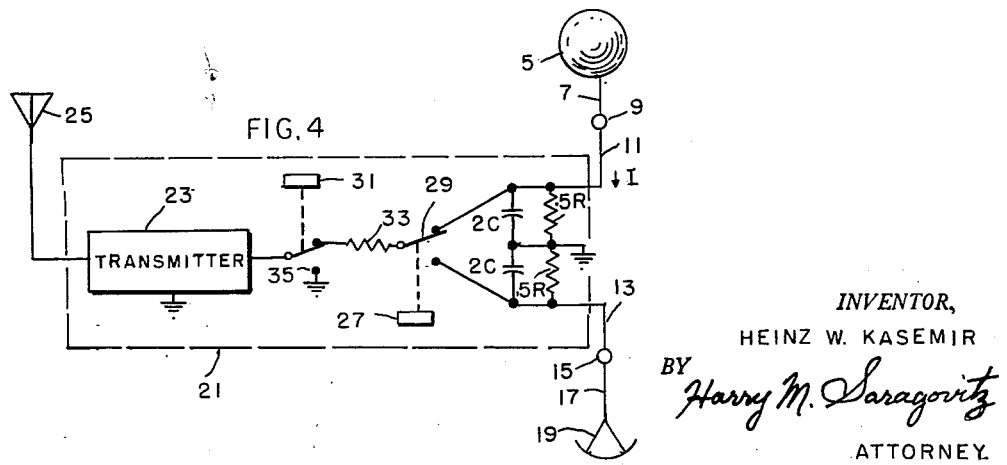
FIG. 4 is a modification of the apparatus shown in FIG. 1.

FIG. 4 shows a second embodiment of the invention which is similar to that of FIG. 1 with the exception of the circuitry inside the radiosonde. The elements similar to those of FIG. 1 bear the same reference numerals and will not be described in detail. In the radiosonde 21 of FIG. 4 both the resistor and capacitor are grounded at their electrical midpoints. Relay 27 is periodically pulsed by a programming circuit, not shown. Thus the input of 23 is alternately switched, by means of relay armature 29, to the upper and lower collectors. The use of a center tapped combination of R and C provides a balanced input to the radiosonde and also permits the frequency of transmitter 23 to vary both above and below its unmodulated, zero input value, thus permitting a larger total deviation in frequency while still operating in the linear range of the instrument. This feature is illustrated by the curve of FIG. 5 which shows the voltage input to transmitter 23 vs. the frequency thereof. Positive input voltages cause an increase in frequency and vice versa. It can be seen from FIG. 5 that the region between points 37 and 39 is substantially linear. The collectors 11 and 13 and resistor R are chosen so that the voltage input to the transmitter falls in this linear region. By alternately feeding positive and negative voltages to the transmitter, it can be seen that the effective linear range of the instrument is doubled. After each five operations of relay 27, relay 31 is automatically actuated, and momentarily grounds the input of transmitter 23, for a zero check. This zero check indicates whether or not the center frequency of 23 has drifted from its pre-set value.

While specific embodiments of this invention have been shown and described, it will be apparent to those skilled in the art that various changes and modifications may be made therein without departing from the true spirit and scope of this invention, as defined in the following claims.

What is claimed is:

1. An instrument for measuring electrical air-earth current comprising two conductive current collectors of equal size symmetrically disposed with respect to a parallel connected resistor-capacitor network, said current collectors being connected at their inner ends to opposite ends of said network, said resistor having a resistance less than 1% of the resistance of that part of the surrounding atmosphere from which current is diverted by said two current collectors, said resistor-capacitor network having a time constant approximately equal to that of the surrounding air, and means connected to said resistor-capacitor network for measuring the voltage developed thereacross.

2. The structure of claim 1, further including means at the outer ends of said current collectors for preventing point discharge therefrom.

3. The structure of claim 1, further including a balloon for carrying said instrument aloft and wherein said last-named means comprises a transmitter for telemetering a signal-to-earth proportional to said air-earth current.

4. An air-borne instrument for measuring air-earth current comprising; a balloon buoyant in air, a first current collector comprising a conductive wire suspended beneath said balloon, the lower end of said first current collector connected to one terminal of a resistor, a second similar current collector suspended from the other terminal of said resistor, said resistor having a resistance of less than one percent of the resistance between the ends of an imaginary cylinder of the surrounding air of height $a$ and cross-sectional area $$\frac{a^2}{3}$$

wherein $a$ is the length of each of said current collectors; further including a capacitor connected to said resistor for by-passing the displacement current therefrom and means conected to said resistor for measuring the voltage developed thereacross.

5. The structure of claim 4, further including means connected to the lower end of said second current collector for maintaining the same taut and vertical.

6. An instrument for measuring air-earth current comprising two elongated, co-linear, conductive current collectors disposed generally parallel to the direction of current flow, the inner ends of said collectors being connected to a center-tapped resistor, said resistor having a resistance of less than one percent of the resistance between the ends of an imaginary cylinder of the surrounding air of height $a$ and cross-sectional area $$\frac{a^2}{3}$$

wherein $a$ is the length of each of said current collectors, means to alternately connect the two current collectors to the input of a frequency-modulated transmitter, and electrical means connected to said resistor for neutralizing the displacement current therefrom.

7. The structure of claim 6 wherein said last-named means comprises a capacitor connected in parallel with said resistor.

8. The structure of claim 7, further including means for carrying said structure aloft.

References Cited in the file of this patent

UNITED STATES PATENTS

| | | |
|---|---|---|
| 1,919,215 | Gunn | July 25, 1933 |
| 2,993,165 | Jauch | July 18, 1961 |

OTHER REFERENCES

IRE Transactions on Instrumentation, September, 1957, pages 195–199.